(12) United States Patent
Lee et al.

(10) Patent No.: US 6,940,676 B1
(45) Date of Patent: Sep. 6, 2005

(54) TRIPLE PUSH-PULL OPTICAL TRACKING SYSTEM

(75) Inventors: Tzuo-Chang Lee, Shrewsbury, MA (US); James Tylock, Shrewsbury, MA (US)

(73) Assignee: Quantum Corporation, San Jose, CA (US)

( * ) Notice: Subject to any disclaimer, the term of this patent is extended or adjusted under 35 U.S.C. 154(b) by 442 days.

(21) Appl. No.: 09/588,891

(22) Filed: Jun. 7, 2000

(51) Int. Cl.[7] .............................................. G11B 15/46
(52) U.S. Cl. ................. 360/72.1; 360/77.03; 369/44.31
(58) Field of Search .............................. 360/77.12, 72.1, 360/77.03, 75, 78.02; 369/112, 44.17, 44.23, 44.11, 14, 44.37, 44.38, 112.24, 97, 44.31

(56) References Cited

U.S. PATENT DOCUMENTS

| | | |
|---|---|---|
| 2,923,781 A | 2/1960 | Gordon et al. |
| 3,113,179 A | 12/1963 | Glenn, Jr. |
| 3,239,841 A | 3/1966 | Henkes, Jr. |
| 3,404,392 A | 10/1968 | Sordello |
| 3,426,337 A | 2/1969 | Black et al. |
| 3,637,991 A | 1/1972 | Yanagawa |
| 3,662,120 A | 5/1972 | Hess |
| 3,768,752 A | 10/1973 | Bettini et al. |
| 3,786,752 A | 1/1974 | Lingens et al. |
| 3,790,755 A | 2/1974 | Silverman |
| 3,838,291 A | 9/1974 | Marion et al. |
| 3,914,793 A | 10/1975 | Burnham |
| 3,916,039 A | 10/1975 | Akashi et al. |
| 3,980,480 A | 9/1976 | Laridon et al. |
| 3,997,715 A | 12/1976 | Elliot |
| 4,008,085 A | 2/1977 | Lemahieu et al. |
| 4,123,788 A | 10/1978 | Kruger |
| 4,176,381 A | 11/1979 | de Niet et al. |
| 4,275,425 A | 6/1981 | Watanabe et al. |
| 4,313,143 A | 1/1982 | Zarr |
| 4,315,283 A | 2/1982 | Kinjo et al. |
| 4,340,305 A | 7/1982 | Smith et al. |
| 4,371,904 A | 2/1983 | Brooke |
| 4,380,032 A | 4/1983 | Pfost |
| 4,424,111 A | 1/1984 | Zielke et al. |
| 4,531,205 A | 7/1985 | Faugeras |

(Continued)

FOREIGN PATENT DOCUMENTS

| | | |
|---|---|---|
| CH | 586 944 | 4/1977 |
| DE | 320195 | 4/1920 |
| DE | 24 06 292 | 8/1975 |

(Continued)

OTHER PUBLICATIONS

Hoagland, A. S. (Mar. 1978). "Optical Servo of Magnetic Recording," *IBM Technical Disclosure Bulletin* 20(10):4108–4109.

(Continued)

*Primary Examiner*—Sinh Tran
*Assistant Examiner*—K. Wong
(74) *Attorney, Agent, or Firm*—Morrison & Foerster LLP

(57) ABSTRACT

A method of generating a composite signal in a closed loop servo signal system of a data recording system used to drive a recording head to any given position within a dynamic range of a servo tracks includes an optical pickup system for generating optical spots focused on a recording medium, the spots separated by equal distances across a track, the optical pickup system receiving a set of reflectances from the spots, a media system for providing the servo tracks responsive to optical spot illumination, an electric system for generating a set of filtered signals from the reflectances and for generating a set of S-curves by pair wise subtraction of the filtered signals, a processing system to generate a composite servo position signal from the S-curves and filtered reflectances, and a servo system for driving the recording head to a desired position by comparing the desired position to a measured position from the composite servo position.

30 Claims, 12 Drawing Sheets

U.S. PATENT DOCUMENTS

| | | | |
|---|---|---|---|
| 4,558,383 A | 12/1985 | Johnson | |
| 4,570,191 A | 2/1986 | Di Stefano et al. | |
| 4,578,311 A | 3/1986 | Ishikuro et al. | |
| 4,626,469 A | 12/1986 | Yamaguchi et al. | |
| 4,633,451 A | 12/1986 | Ahn et al. | |
| 4,679,104 A | 7/1987 | Dahlerud | |
| 4,684,547 A | 8/1987 | DiStefano et al. | |
| 4,737,877 A | 4/1988 | Krongelb et al. | |
| 4,746,542 A | 5/1988 | Chino et al. | |
| 4,750,067 A | 6/1988 | Gerfast | |
| 4,775,968 A * | 10/1988 | Ohsato | 369/44.37 |
| 4,802,030 A | 1/1989 | Henry et al. | |
| 4,816,939 A | 3/1989 | Ford et al. | |
| 4,816,941 A | 3/1989 | Edel et al. | |
| 4,843,494 A | 6/1989 | Cronin et al. | |
| 4,848,698 A | 7/1989 | Newell et al. | |
| 4,868,046 A | 9/1989 | Moriizumi et al. | |
| 4,876,886 A | 10/1989 | Bible et al. | |
| 4,884,260 A | 11/1989 | Bouldin et al. | |
| 4,935,835 A | 6/1990 | Godwin et al. | |
| 4,937,810 A | 6/1990 | Drexler et al. | |
| 4,958,245 A | 9/1990 | Roth et al. | |
| 4,961,123 A | 10/1990 | Williams et al. | |
| 4,969,058 A | 11/1990 | Williams et al. | |
| 4,983,496 A | 1/1991 | Newell et al. | |
| 5,008,765 A | 4/1991 | Youngquist | |
| 5,016,240 A | 5/1991 | Strandjord et al. | |
| 5,038,030 A | 8/1991 | Hayashi et al. | |
| 5,050,017 A | 9/1991 | Carr et al. | |
| 5,060,212 A | 10/1991 | Fujita et al. | |
| 5,065,387 A | 11/1991 | Roth et al. | |
| 5,067,039 A | 11/1991 | Godwin et al. | |
| 5,073,884 A | 12/1991 | Kobayashi | |
| 5,097,351 A | 3/1992 | Kramer | |
| 5,105,322 A | 4/1992 | Steltzer | |
| 5,111,448 A | 5/1992 | Komma et al. | |
| 5,120,927 A | 6/1992 | Williams et al. | |
| 5,121,371 A | 6/1992 | Farnsworth et al. | |
| 5,144,604 A | 9/1992 | Sugiura | |
| 5,155,717 A * | 10/1992 | Bakx | 369/44.37 |
| 5,163,032 A | 11/1992 | Van Nieuwland et al. | |
| 5,179,463 A | 1/1993 | Kramer | |
| 5,196,297 A | 3/1993 | Dombrowski, Jr. et al. | |
| 5,196,969 A | 3/1993 | Iwamatsu et al. | |
| 5,210,672 A | 5/1993 | Ivers et al. | |
| 5,218,595 A | 6/1993 | Lehureau et al. | |
| 5,229,620 A | 7/1993 | Pahr | |
| 5,237,556 A * | 8/1993 | Pierce | 369/97 |
| 5,262,908 A | 11/1993 | Iwamatsu et al. | |
| 5,279,775 A | 1/1994 | Thomas et al. | |
| 5,280,402 A | 1/1994 | Anderson et al. | |
| 5,283,773 A | 2/1994 | Thomas et al. | |
| 5,293,367 A | 3/1994 | Kadowaki et al. | |
| 5,311,378 A | 5/1994 | Williams et al. | |
| 5,319,507 A | 6/1994 | Umebayashi et al. | |
| 5,322,987 A | 6/1994 | Thomas et al. | |
| 5,331,621 A | 7/1994 | Miyake et al. | |
| 5,333,091 A | 7/1994 | Iggulden et al. | |
| 5,334,849 A | 8/1994 | Thomas et al. | |
| 5,349,484 A | 9/1994 | Koehler | |
| 5,363,255 A | 11/1994 | Ivers et al. | |
| 5,369,631 A | 11/1994 | Hwang | |
| 5,371,636 A | 12/1994 | Nayak et al. | |
| 5,379,283 A | 1/1995 | Miyajima | |
| 5,379,710 A | 1/1995 | Parnigoni | |
| 5,414,578 A | 5/1995 | Lian et al. | |
| 5,414,585 A | 5/1995 | Saliba | |
| 5,432,652 A | 7/1995 | Comeaux et al. | |
| 5,448,430 A | 9/1995 | Bailey et al. | |
| 5,450,257 A | 9/1995 | Tran et al. | |
| 5,452,152 A | 9/1995 | Rudi | |
| 5,457,586 A | 10/1995 | Solhjell | |
| 5,462,823 A * | 10/1995 | Evans et al. | 430/14 |
| 5,475,670 A | 12/1995 | Hamada et al. | |
| 5,493,554 A | 2/1996 | Sasaki et al. | |
| 5,510,140 A | 4/1996 | Kurose et al. | |
| 5,515,212 A | 5/1996 | Chiao et al. | |
| 5,515,353 A * | 5/1996 | Miyazaki et al. | 369/112.04 |
| 5,518,804 A | 5/1996 | Mizuno et al. | |
| 5,523,904 A | 6/1996 | Saliba | |
| 5,532,042 A | 7/1996 | Kawarai et al. | |
| 5,535,069 A | 7/1996 | Chiao et al. | |
| 5,535,190 A | 7/1996 | Moore et al. | |
| 5,563,868 A | 10/1996 | Farnsworth et al. | |
| 5,566,033 A | 10/1996 | Frame et al. | |
| 5,581,523 A | 12/1996 | Seki et al. | |
| 5,589,247 A | 12/1996 | Wallack et al. | |
| 5,606,542 A | 2/1997 | Kim | |
| 5,615,205 A | 3/1997 | Belser | |
| 5,633,844 A | 5/1997 | Maeda et al. | |
| 5,648,946 A | 7/1997 | Yamazaki | |
| 5,648,951 A | 7/1997 | Kato et al. | |
| 5,661,616 A | 8/1997 | Tran et al. | |
| 5,661,823 A | 8/1997 | Yamaguchi et al. | |
| 5,673,245 A * | 9/1997 | Yanagawa et al. | 369/112.29 |
| 5,674,583 A | 10/1997 | Nakayama et al. | |
| 5,675,448 A | 10/1997 | Molstad et al. | |
| 5,677,806 A | 10/1997 | Eckberg et al. | |
| 5,680,278 A | 10/1997 | Sawtelle, Jr. | |
| 5,680,384 A | 10/1997 | Seki et al. | |
| 5,687,155 A | 11/1997 | Fukakusa et al. | |
| 5,689,384 A | 11/1997 | Albrecht et al. | |
| 5,705,268 A | 1/1998 | Ishikawa et al. | |
| 5,717,674 A | 2/1998 | Mori et al. | |
| 5,718,964 A | 2/1998 | Naoe et al. | |
| 5,726,834 A | 3/1998 | Eckberg et al. | |
| 5,729,519 A | 3/1998 | Nakanishi et al. | |
| 5,737,297 A * | 4/1998 | Mashiyama et al. | 369/112.24 |
| 5,742,572 A * | 4/1998 | Tezuka et al. | 369/44.23 |
| 5,774,313 A | 6/1998 | Tanaka et al. | |
| 5,815,482 A | 9/1998 | Rope et al. | |
| 5,855,589 A | 1/1999 | McEwen et al. | |
| 5,858,589 A | 1/1999 | Govaert et al. | |
| 5,872,675 A | 2/1999 | Solhjell | |
| 5,877,910 A | 3/1999 | Williams et al. | |
| 5,886,645 A | 3/1999 | Eaton | |
| 5,886,964 A * | 3/1999 | Fujita | 369/44.37 |
| 5,917,790 A | 6/1999 | Ohta et al. | |
| 5,993,948 A | 11/1999 | Yamazaki et al. | |
| 6,018,434 A * | 1/2000 | Saliba | 360/74.6 |
| 6,031,671 A | 2/2000 | Ayres | |
| 6,033,752 A | 3/2000 | Suzuki et al. | |
| 6,063,489 A | 5/2000 | Kobayashi et al. | |
| 6,075,676 A | 6/2000 | Hiraoka et al. | |
| 6,084,740 A * | 7/2000 | Leonhardt et al. | 360/77.12 |
| 6,103,365 A * | 8/2000 | Ishii et al. | 428/332 |
| 6,108,159 A | 8/2000 | Nute et al. | |
| 6,236,529 B1 | 5/2001 | Leonhardt et al. | |
| 6,246,535 B1 * | 6/2001 | Saliba et al. | 360/77.12 |
| 6,319,595 B1 | 11/2001 | Katashima et al. | |
| 6,433,951 B1 * | 8/2002 | Lubratt | 360/77.12 |
| 6,480,351 B2 | 11/2002 | Leonhardt et al. | |
| 2001/0006437 A1 | 7/2001 | Leonhardt et al. | |

FOREIGN PATENT DOCUMENTS

| | | |
|---|---|---|
| DE | 26 16 362 | 3/1977 |
| DE | 32 01 935 | 8/1983 |
| DE | 34 17 426 | 11/1985 |
| DE | 41 42 052 | 7/1992 |
| EP | 0 069 548 | 1/1983 |
| EP | 0 083 753 | 7/1983 |

| | | |
|---|---|---|
| EP | 0 097 774 | 1/1984 |
| EP | 0 108 258 | 5/1984 |
| EP | 0 119 568 | 9/1984 |
| EP | 0 130 495 | 1/1985 |
| EP | 0 155 000 | 9/1985 |
| EP | 0 166 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |
| EP | 0 311 485 | 4/1989 |
| EP | 0 311 859 | 4/1989 |
| EP | 0 336 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |
| EP | 0 390 555 | 10/1990 |
| EP | 0 423 662 | 4/1991 |
| EP | 0 434 230 | 6/1991 |
| EP | 0 443 810 | 8/1991 |
| EP | 0 484 774 | 5/1992 |
| EP | 0 484 775 | 5/1992 |
| EP | 0 484 779 | 5/1992 |
| EP | 0 484 780 | 5/1992 |
| EP | 0 496 132 | 7/1992 |
| EP | 0 496 461 | 7/1992 |
| EP | 0 535 112 | 4/1993 |
| EP | 0 549 845 | 7/1993 |
| EP | 0 549 854 | 7/1993 |
| EP | 0 555 511 | 8/1993 |
| EP | 0 564 187 | 10/1993 |
| EP | 0 596 503 | 5/1994 |
| EP | 0 598 503 | 5/1994 |
| EP | 0 606 710 | 7/1994 |
| EP | 0 645 043 | 3/1995 |
| EP | 0 645 044 | 3/1995 |
| EP | 0 655 960 | 6/1995 |
| EP | 0 684 597 | 11/1995 |
| EP | 0 854 471 | 7/1998 |
| EP | 1 026 665 | 8/2000 |
| EP | 1 026 666 | 8/2000 |
| EP | 1 026 667 | 8/2000 |
| EP | 1 117 092 | 7/2001 |
| EP | 1 205 912 | 5/2002 |
| EP | 1 205 913 | 5/2002 |
| FR | 2 315 142 | 1/1977 |
| GB | 2 008 290 | 5/1979 |
| GB | 1 595 136 | 8/1981 |
| GB | 2 121 227 | 12/1983 |
| GB | 2 335 785 | 9/1999 |
| JP | 56-111169 | 9/1981 |
| JP | 57-50346 | 3/1982 |
| JP | 57-120230 | 7/1982 |
| JP | 57-120255 | 7/1982 |
| JP | 61-142530 | 6/1986 |
| JP | 62-192025 | 8/1987 |
| JP | 63-148416 | 6/1988 |
| JP | 63-251924 | 10/1988 |
| JP | 64-70916 | 3/1989 |
| JP | 2-188915 | 7/1990 |
| JP | 3-141087 | 6/1991 |
| JP | 3-201215 | 9/1991 |
| JP | 3-219432 | 9/1991 |
| JP | 3-242816 | 10/1991 |
| JP | 4-3832 | 1/1992 |
| JP | 4-38632 | 2/1992 |
| JP | 4-59399 | 2/1992 |
| JP | 4-252417 | 9/1992 |
| JP | 4-305844 | 10/1992 |
| JP | 5-73883 | 3/1993 |
| JP | 5-073883 | 3/1993 |
| JP | 6-020414 | 1/1994 |
| JP | 6-139549 | 5/1994 |
| JP | 6-243619 | 9/1994 |
| JP | 6-259736 | 9/1994 |
| JP | 6-293372 | 10/1994 |
| JP | 7-29136 | 1/1995 |
| JP | 7-57412 | 3/1995 |
| JP | 7-65434 | 3/1995 |
| JP | 7-182626 | 7/1995 |
| JP | 7-220255 | 8/1995 |
| JP | 8-174669 | 7/1996 |
| JP | 11-213384 | 8/1996 |
| JP | 8-278614 | 10/1996 |
| JP | 9-7131 | 1/1997 |
| JP | 9-007131 | 1/1997 |
| JP | 9-35246 | 2/1997 |
| JP | 9-033773 | 2/1997 |
| JP | 9-035246 | 2/1997 |
| JP | 9-265626 | 10/1997 |
| JP | 9-288813 | 11/1997 |
| JP | 9-289885 | 11/1997 |
| JP | 9-289973 | 11/1997 |
| JP | 9-293230 | 11/1997 |
| JP | 9-297914 | 11/1997 |
| JP | 9-320197 | 12/1997 |
| JP | 10-043924 | 2/1998 |
| JP | 10-190867 | 7/1998 |
| JP | 10-251432 | 9/1998 |
| JP | 10-297181 | 11/1998 |
| JP | 11-66529 | 3/1999 |
| JP | 11-66745 | 3/1999 |
| JP | 11-96705 | 4/1999 |
| JP | 11-126328 | 5/1999 |
| JP | 11-154312 | 6/1999 |
| JP | 11-161928 | 6/1999 |
| JP | 11-213383 | 8/1999 |
| JP | 11-242814 | 9/1999 |
| JP | 11-339254 | 12/1999 |
| JP | 11339254 A * 12/1999 | ............ G11B/5/78 |
| JP | 11-353642 | 12/1999 |
| JP | 2001-067652 | 3/2001 |
| JP | 2001-076326 | 3/2001 |
| KR | 9406847 | 7/1994 |
| SU | 1137513 | 1/1985 |
| WO | WO 83/01858 | 5/1983 |
| WO | WO 85/02933 | 7/1985 |
| WO | WO 85/03376 | 8/1985 |
| WO | WO 88/02168 | 3/1988 |
| WO | WO 91/20077 | 12/1991 |
| WO | WO 93/25343 | 12/1993 |
| WO | WO 93/26004 | 12/1993 |
| WO | WO 93/26007 | 12/1993 |
| WO | WO 94/12975 | 6/1994 |
| WO | WO 99/21178 | 4/1999 |
| WO | WO 99/21179 | 4/1999 |
| WO | WO 99/27530 | 6/1999 |
| WO | WO 99/28909 | 6/1999 |
| WO | WO 00/30079 | 5/2000 |
| WO | WO 00/49604 | 8/2000 |
| WO | WO 00/49605 | 8/2000 |
| WO | WO 00/49607 | 8/2000 |

OTHER PUBLICATIONS

Ishiguro, H. et al. (Feb. 1996). "A Laser–Detector–Hologram Unit with IV Amplifiers and Built–in Micro–Mirror," *ISSCC* SA 20.3:330–331.

Johnson, M. (Aug. 1990). "Spatial Filtering for Storage Technology," *IBM Technical Disclosure Bulletin* 33(3A):191–193.

Lambert, S.E. and Rugar, D. (Apr. 1990). "Servo Scheme for Patterned Media Using Optical Detection Integrated with Head Structure," *IBM Technical Disclosure Bulletin* 32(11):397–399.

Yoshikawa, A. et al. (May 1995). "Laser–Detector–Hologram Unit for Thin Optical Pick–up Head of a CD Player," IEEE Trans. on Components, Packaging, and Manufacturing Technology Part B, 18(2):245–249.

* cited by examiner

TRIPLE PUSH-PULL OPTICAL TRACKING SYSTEM

BACKGROUND

This invention relates generally to optical tracking systems. Increased data storage capacity and retrieval performance is required of commercially viable mass storage devices and media, such as linear magnetic tape. Linear magnetic tape systems, for example, have moved toward multi-head, multi-channel fixed head structures with narrowed recording gaps and track widths. Such narrow recording heads allow many linear tracks to be formed on a tape medium of predetermined width, such as one-half inch width tape. Tape substrates are also being made thinner, with increased tape lengths being made possible in smaller diameter reels.

Because of a relatively high linear tape velocity and because tape substrates continue to be made thinner and thinner, guiding tape past a tape head structure, such as a magnetic recording head, along an accurate invariant linear path is difficult and can lead to errors in reading and writing to the tape. One such error is referred to as "lateral tape motion," commonly referred to as LTM. LTM refers to the lateral motion of the tape as it travels across the magnetic recording head and is inherent in mechanical transport systems such as linear magnetic tape systems. LTM is a source of tracking errors in linear tape recording systems.

SUMMARY

In a general aspect of the invention, a method of generating a composite signal in a servo loop of a data recording system to drive a recording head to any given position within any servo track includes an optical pickup system for generating optical spots focused on a recording medium, the spots separated by equal distances across a track, the optical pickup means receiving, a set of reflectances from the spots, a media system for providing the servo tracks responsive to optical spot illumination, an electronic system for generating a set of filtered signals from the reflectances and for generating a set of S-curves by pair wise subtraction of theee filtered signals, a processing system to generate a composite servo position signal from the S-curves and filtered reflectances, and a servo system for driving the recording head to a desired position by comparing the desired position to a measured position from the composite servo position.

Embodiments of the invention may have one or more of the following advantages.

The invention reduces the amount of space required on the magnetic side of the tape to provide position information. One can use relatively large track pitch and correspondingly large optical spots to achieve tracking positioning accurate to a small fraction of track pitch. Utilizing the back surface of the tape with the ability to track at any position on the optical pattern increases the efficiency of data storage on the magnetic side of the tape.

The invention overcomes the difficulty of accurately aligning a chosen position on a magnetic head !with an optical spot from an optical pickup system. This difficulty is particularly severe when optical tracks are on the non-recording side of the media. With this invention any alignment offset between head and optics is compensated by tracking an equal but opposite offset. In so doing the recording head is always aligned to the pre-determined track position of the tape, making tape interchange possible. Utilizing the back surface of the tape with the ability to track at any position on the optical pattern increases the efficiency of data storage on the magnetic side of the tape.

The details of one or more embodiments of the invention are set forth in the accompanying drawings and the description below. Other features, objects, and advantages of the invention will be apparent from the description and drawings, and from the claims.

DESCRIPTION OF DRAWINGS

The foregoing features and other aspects of the invention will be described further in detail by the accompanying drawings, in which.

Like reference symbols in the various drawings indicate like elements.

DETAILED DESCRIPTION

In the following detailed discussion, specific component examples are used to describe an overall system concept. For example, a linear magnetic tape is used to represent a recording media, a series of equally spaced marks used to represent an optical track, two detector elements used to receive the reflectance from each optical spot, and the backside of the magnetic tape is used for the servo tracks. However, the invention described herein applies to any recording media, such as an optical disk or a magnetic disk, for an optical track defined by a solid line, whether one uses one detector per optical spot or multiple detectors per optical spot, and whether the servo tracks are on the magnetic recording side or on the back side of the magnetic tape.

Figure 1:
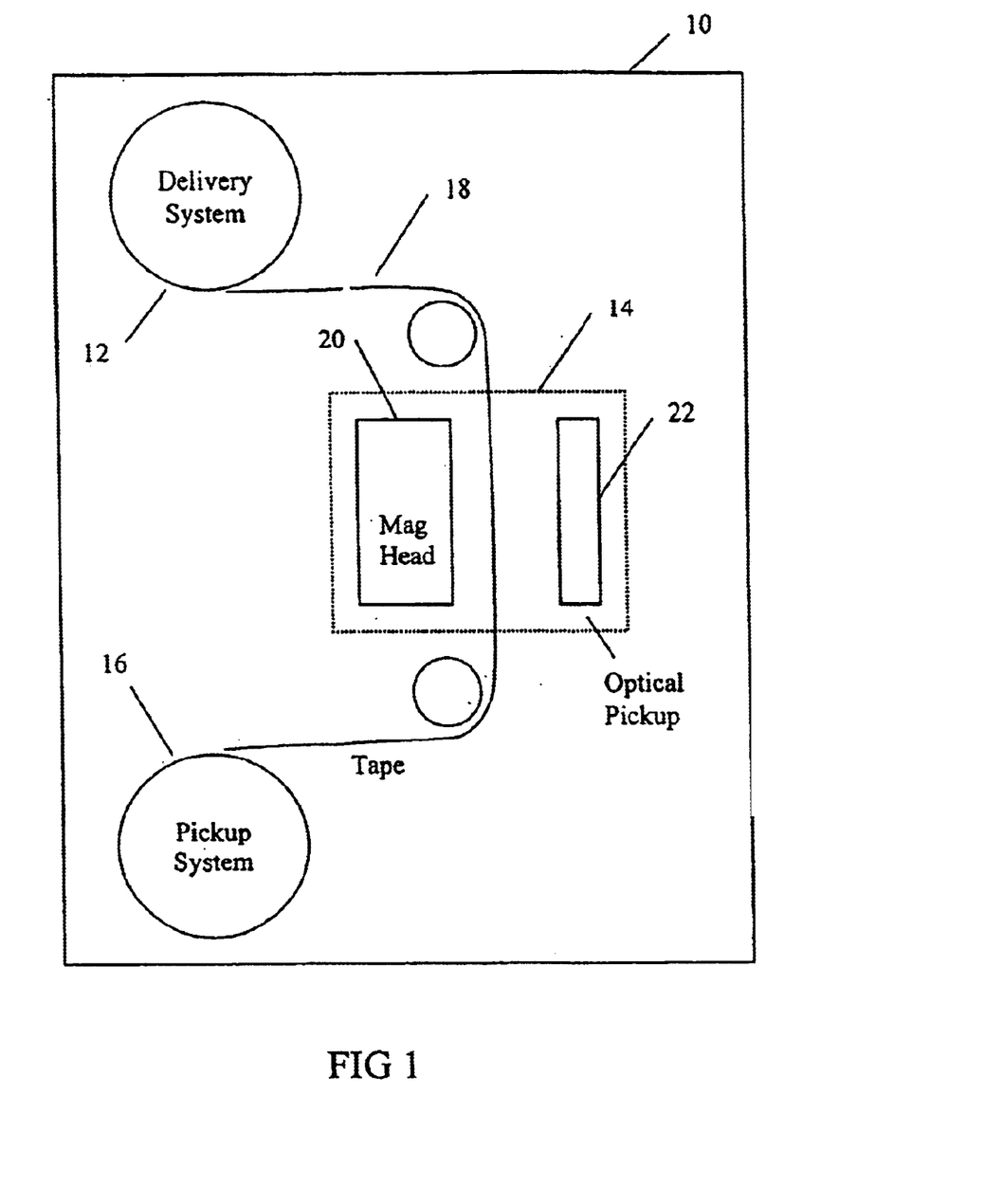
FIG. 1 is a block diagram of a linear magnetic tape system.

Referring to FIG. 1, an exemplary linear tape system 10 includes a delivery system 12, a read/write head assembly 14 and a pickup system 16. The delivery system 12 houses a magnetic tape 18. The magnetic tape 18 travels past a recording head 20 and an optical pickup system 22 contained in the read/write head assembly 14 and is delivered to the reel pickup system 16. The recording head 20 reads and writes information, generally referred to as data, to the magnetic tape 18 as it travels from the delivery system 12 to the pickup system 16. As the magnetic tape 18 passes over the recording head 20 the magnetic tape 18 may become misaligned with respect to the intended track position due to, for example, lateral tape motion (LTM). If left un-corrected, one is forced to use a recording track pitch much larger than the LTM. However, changes in lateral position can be detected by the optical pickup system 22 when servo tracks are engraved on the tape and be compensated via a closed servo control loop.

Figure 2A:
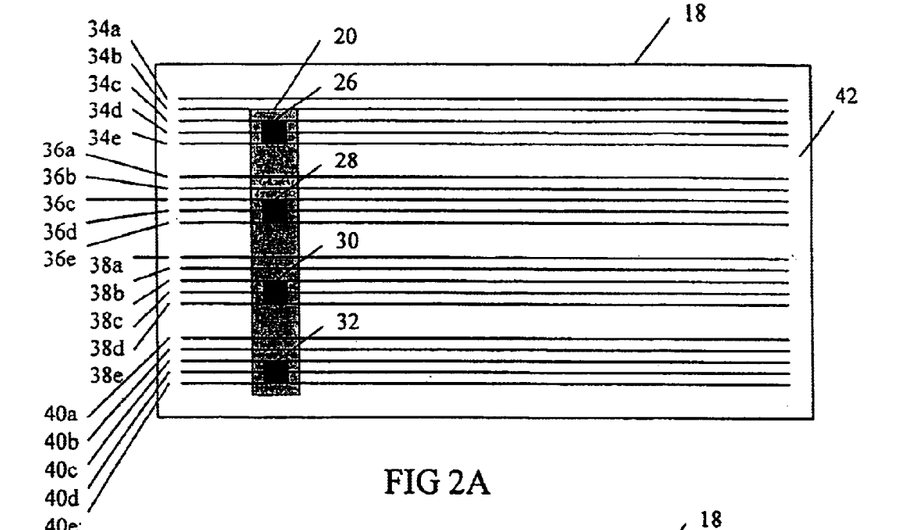
FIG. 2A, and FIG. 2B are a block diagrams of a magnetic tape.

Referring to FIG. 2, a block diagram of the magnetic tape 18 using one optical servo track to control the read/write of multiple magnetic heads is shown. Referring to FIG. 2A, four magnetic recording elements 26, 28, 30 and 32 are enclosed in the recording head 20 that read and write to five different magnetic tracks labeled 34a–e, 36a–e, 38a–e and 40a–e on the front side 42 of the magnetic tape 18. Each of the four elements 26, 28, 30 and 32 write or read in parallel to an individual track 34-40 during one pass of the tape, to tracks 26d, 28d, 30d and 32d for example.

Figure 2B:
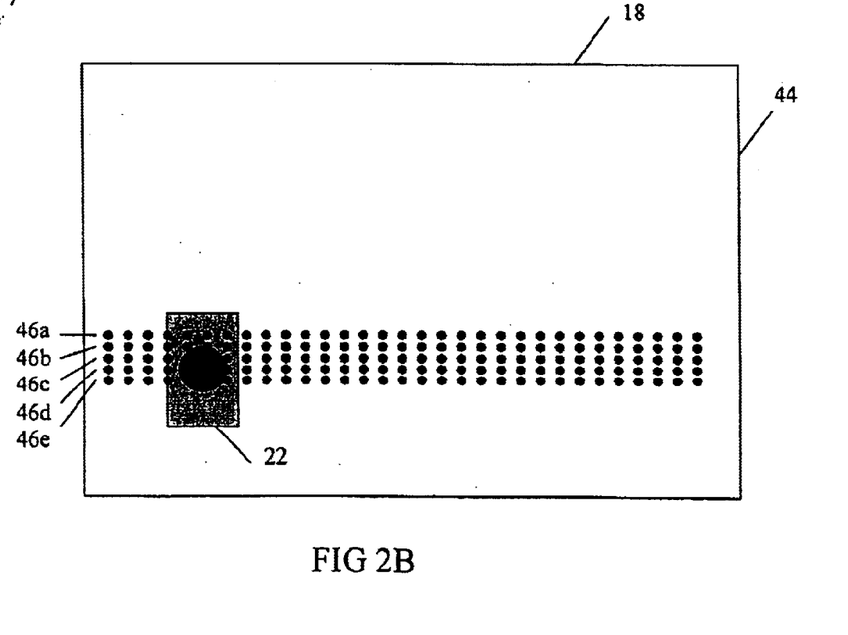

Referring to FIG. 2B, a backside 44 (also referred to a non-magnetic side) of the magnetic tape 18 includes five optical tracks labeled 46a, 46b, 46c, 46d and 46e. Each of the optical tracks 46a–46e is permanently burned into the backside 44 of the magnetic tape 18.

The optical pickup assembly 22 is aligned with magnetic recording element 34 in the recording head 20. When a servo loop is closed, each of the five optical tracks 46a–46e is responsible for the read/write action of four magnetic tracks. In this way the five optical tracks multiplied by four read/write heads generates twenty magnetic tracks that span the tape.

The read/write head assembly 14 uses the optical pickup system 22 and the optical tracks 46 to detect position errors and compensate for effects of lateral tape movement (LTM), fully described below.

Figure 3:
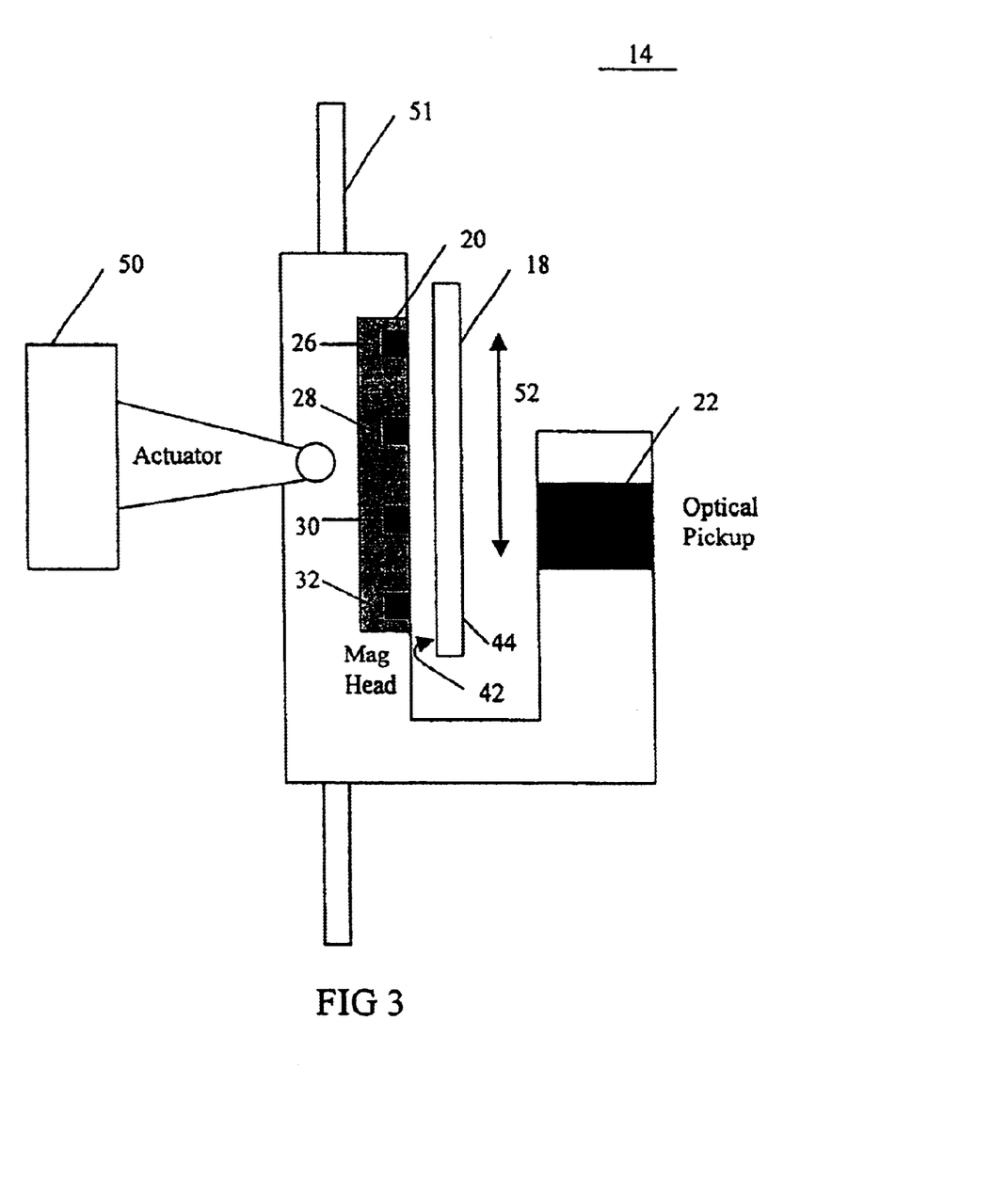
FIG. 3 is a block diagram of the read/write head assembly of FIG. 1.

Referring to FIG. 3, the read/write head assembly 14 includes the recording head 20 and the optical pickup system 22. An actuator 50 is shown connected to the read/write head assembly 14. In operation, the magnetic tape 18 moves across the magnetic recording head 20 and a set of four data tracks (not shown) are recorded or read from the tape. In one example of a write, the front side 42 of the magnetic tape 18 receives data on its recording tracks 34d, 36d, 38d and 40d(of FIG. 2A) from a series of recording channels 26, 28, 30 and 32 residing on the recording head 20. The optical pickup system 22 utilizes a servo track 46d on the backside 44 of the magnetic tape 18 to detect LTM of the magnetic tape 18 along an axis 52. Compensation is then done by positioning of the read/write head assembly 14 via movement of the actuator 50. Any of the individual optical tracks 46a–46e is used one at a time for "track following" during a recording event.

Figure 4:
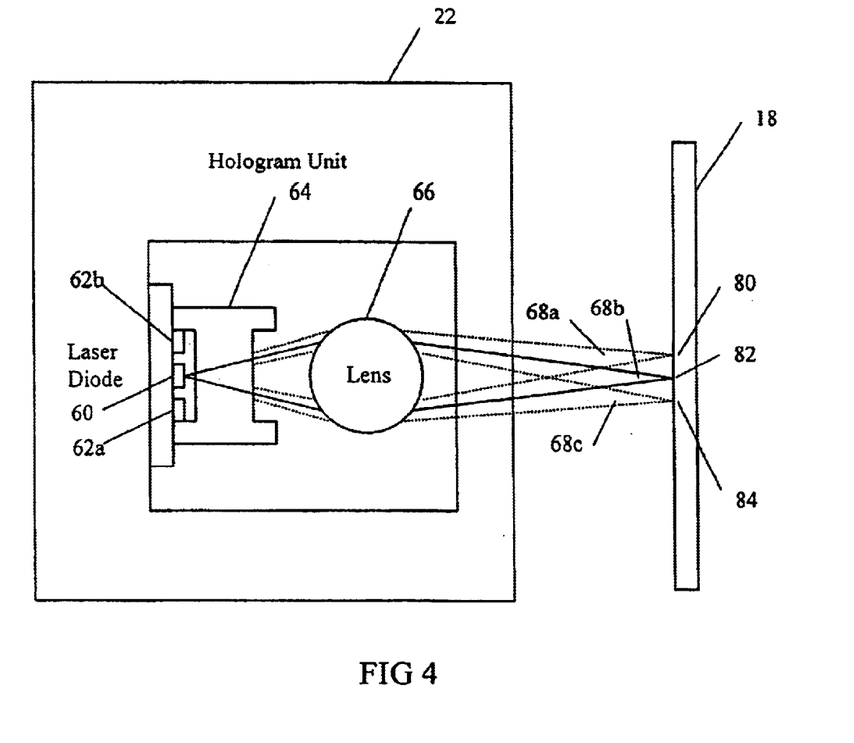
FIG. 4 is a block diagram showing one example of using an optical pickup system to generate three optical spots.

Referring to FIG. 4, an optical pickup system 22 that focuses three spots on the recording medium 18 is shown. The present invention uses three optical spots to provide three servo push pull signals. The optical pickup system 22 includes a laser diode 60, two segmented detectors 62a and 62b, a hologram unit 64, and a lens unit 66. A divergent beam out of the laser diode 60 is focused on the tape 18 via the action of the lens unit 66. The hologram unit 64 divides the single laser beam into multiple beams such that one can derive three beams 68a–c to focus on the tape 18. The hologram unit 64 also allows the three beams 68a–c reflected off the tape to focus on the two segmented detectors 62a and 62b.

Figure 5:
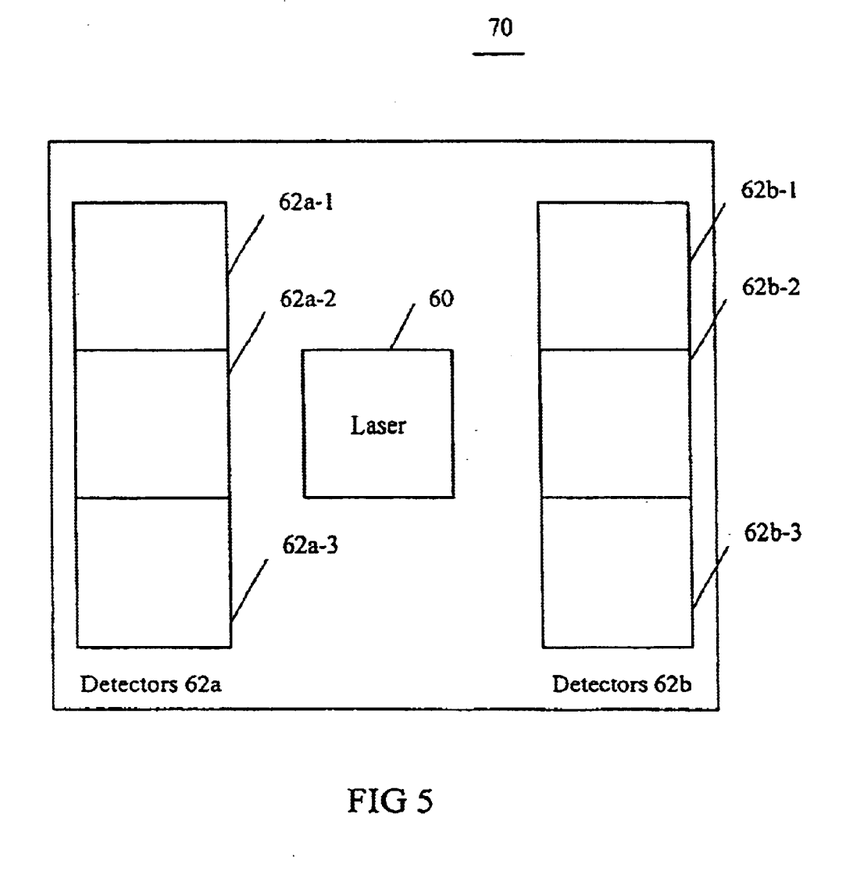
FIG.5 is a block diagram of an optical chip combining the functions of the laser diode and the detectors.

Referring to FIG. 5, a block diagram of the laser and detectors are shown integrated on a silicon die 70. The detectors 62a and 62b each contain three detector segments, identified as 62a-1, 62a-2, 62a-3, and 62b-1, 62b-2, 62b-3. The reflectance due to optical spot 80 (of FIG. 4) would fall on detectors 62a-1, and 62b-1, the reflectance due to spot 82 (of FIG. 4) would fall on 62a-2, and 62b-2, and the reflectance due to spot 84 (of FIG. 4) would fall on 62a-3 and 62b-3. The photocurrents from the corresponding -detector pair such as 62a-1 and 62b-1 may be combined to represent the reflectance from spot 80. Likewise, 62a-2 and 62b-2 can be combined to represent the reflectance from spot 82, and 62a-3 and 62b-3 can be combined to represent the reflectance from spot 84. In an embodiment, these three reflectance signals are combined to produce signals used in this invention.

Figure 6:
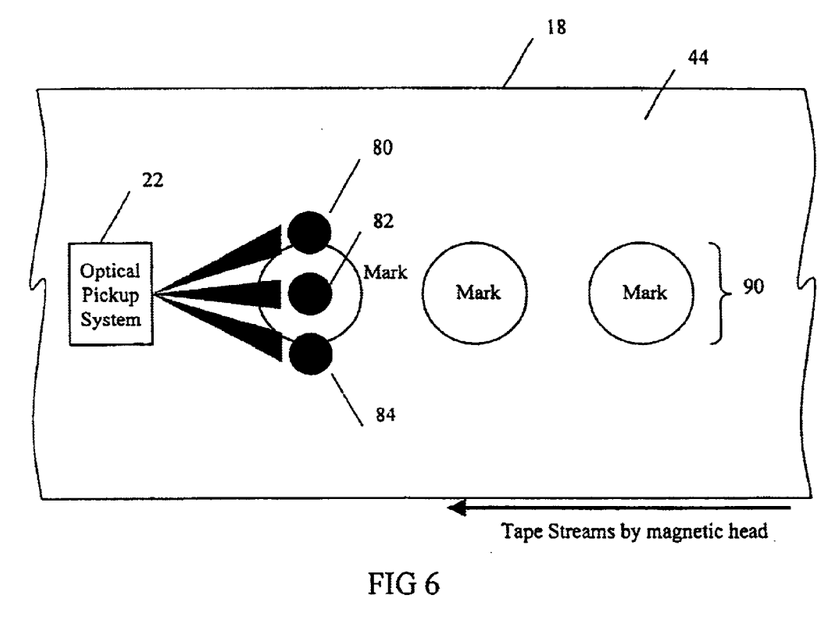
FIG. 6 is a block diagram of one optical track made of a series of marks and the three laser spots illuminating the optical track.

Referring to FIG. 6, a single servo track represented by a low of marks 90 on the backside 44 of magnetic tape 18 is shown. As the magnetic tape 18 streams by the optical pickup system 22, each of the marks on row 90 passes under the laser spots 80, 82 and 84. And detector pairs, 62a-1 and 62b-1, 62a-2 and 62b-2, and 62a-3 and 62b-3 capture the reflectance from the three spots respectively. The row of marks 90 passes under the laser beam 60 at such a speed during magnetic tape movement so as to be seen, in effect, as a solid line by the detectors 62a and 62b. When the laser 60 is perfectly aligned with the servo track 90, the spot 82 will be totally immersed in the solid line caused by the movement of the row of marks 90, while the spots 80 and 84 will be partially immersed in the solid line since they are spaced equal distance from the center spot 82. In a preferred embodiment, the spacing is one third of a track pitch. When the reflectance from spots 80 and 84 are subtracted, a new signal is generated which is referred to as a push-pull signal. In this instance, when the laser is perfectly aligned with the servo track, the push pull value is zero. However, if the three spots are allowed to traverse through the servo track, then the push pull signal defined by spot 80 and 84 will generate a curve traditionally called an S-curve.

Figure 7:
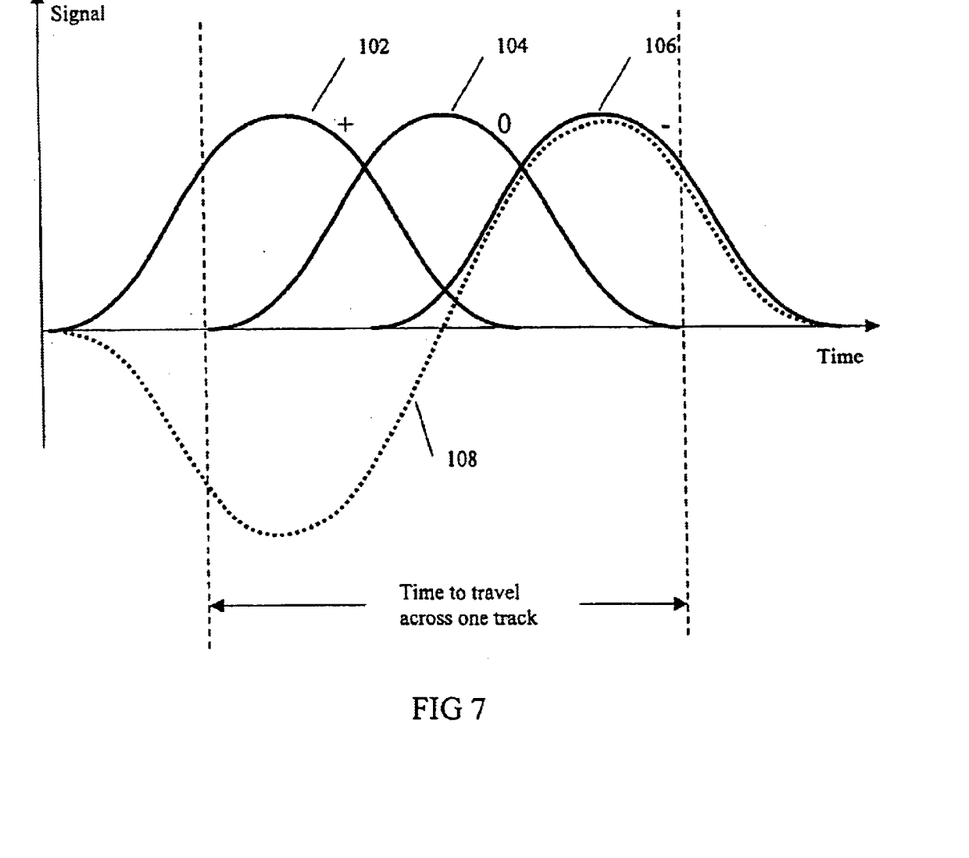
FIG. 7 is graph of three reflectance curves generated by the three spots as they traverse across the optical track, and the S-curve generated by the top and bottom spots.

Referring to FIG. 7, a graph of individual reflectance curves 102, 104, and 106 from the three spots as they traverse through the single optical track in FIG.6 is shown, along with an S-curve 108 formed by spots 80 and 84. The S-curve 108 does possess a limited linear dynamic range, extending less than one third of a track pitch. Such an S-curve 108 is used to allow the central spot 82 to stay on the center of the optical track. However, as shown below, the dynamic linear range is extended to cover the entire track pitch by using three pairs of push-pulls.

Figure 8:
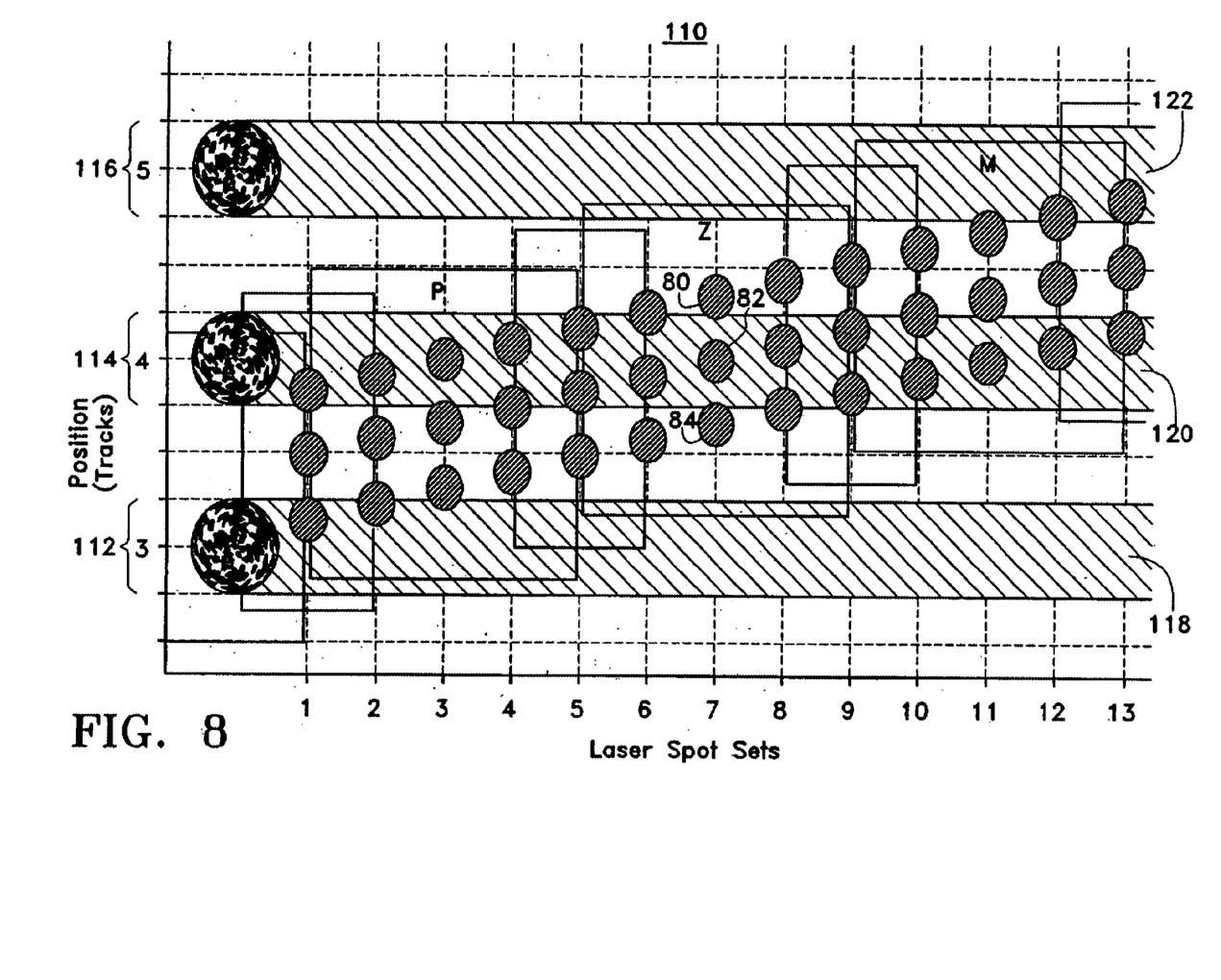
FIG. 8 is a graph of the time progression as the three optical spots traverse three optical servo tracks.

Referring to FIG. 8 a graph is shown to illustrate a time progression as the three optical spots 80, 82, and 84 traverse across a multitude of tracks 112–116. Specifically, track 112 is represented by a row of marks in a solid track 118, track 114 is represented by a row of marks in a solid track 120, and track 116 is represented by a row of marks in a solid track 122. As discussed above, each row of marks appears as a solid line, i.e., zone, as the magnetic tape streams past the recording head 20 and the optical pickup system 22; this solid line of marks is seen as the shaded solid tracks 118, 120 and 122.

Each vertical group of three spots indicates a potential laser position relative to a track position, and thus a recording channel position, over time. The optical pickup system 22 samples and obtains a set of three spots as time passes. For example, at time 7, the middle spot 82 is fully immersed in the row of marks representing track 114, i.e., zone 120, with the top spot 80 and bottom spot 84 only partially immersed in solid zone 120. The detector pairs from the corresponding segments in 62a and 62b pick up the reflectance from the spots 80, 82, and 84.

The reflectance changes depending on the position of the spots, i.e., at time instant 7, small amplitude is seen from the top spot 80 and bottom spot 84 and larger amplitude is seen from the middle spot 82.

At sample time 6, the bottom spot 84 is not immersed in zone 120, while the central spot 82 is totally immersed in zone 120 and the top spot 80 is partially immersed in zone 120. At sample time 8, the bottom spot 84 is partially immersed in zone 120, the center spot 82 is totally immersed in zone 120, and the top spot 80 is not immersed in zone 120.

As mentioned previously, a single S-curve from the push pull signal of one pair of optical spots provides limited useful position information of the laser relative to any given optical servo track. However, FIG. 8 shows that three S-curves from three pairs of push pulls allow one to derive position information within any position of any given track. The reflectance from an optical spot that is saturated at its maximum or minimum amplitude is discarded, leaving two optical spots having reflectance with the largest amplitude gradient. The difference of these reflectance constitute linear portion of the S-curve in an individual zone. As will be seen below, six such zones provide useful position information within the entire track.

Figure 9:
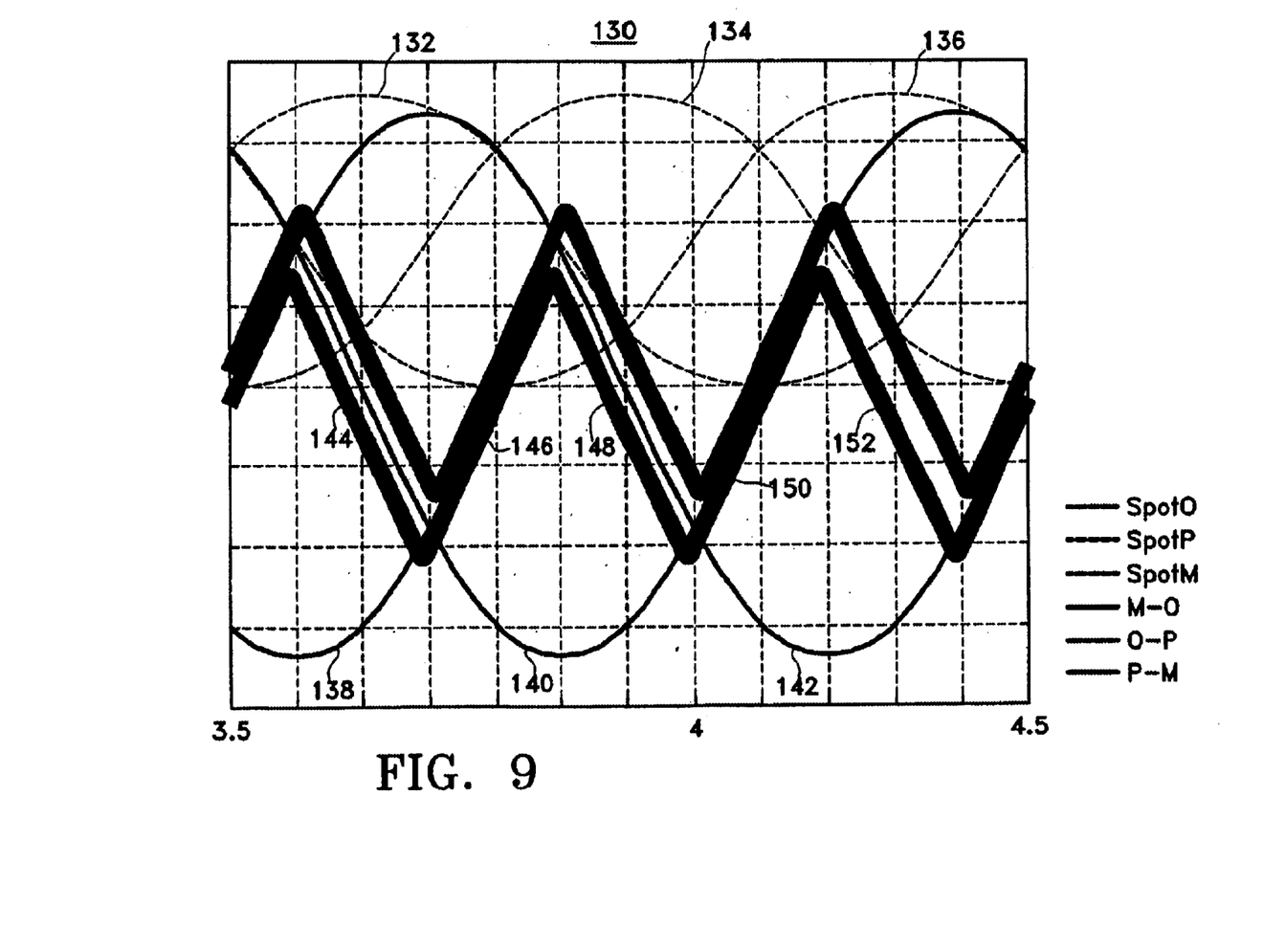
FIG. 9 is a graph of three reflectance from three spots traversing the servo tracks, and three S-curves due to a pair.

Referring to FIG. 9, a graph 130 of S-Curves derived from the repeating optical zones tri of FIG. 8 includes spot reflectances 132, 134 and 136 as dashed lines. A set of three pairs of optical reflectance generates the three S-curves 138–142 shown in bold in FIG. 9. The linear sections 144, 146, 148, 150 and 152 correspond to useful position information within any individual zone. At any given time period, a triple push-pull engine calculates a difference from the two signals in a three-signal group having the greatest amplitude gradient. Transitions from one difference curve to another are accomplished via a merging, i.e., blending, process where the S-curves intersect. The three S-curves and the transition between them form a basis of a triple push pull method. The blending of one S-curve to another uses a weighted average algorithm.

Figure 10:
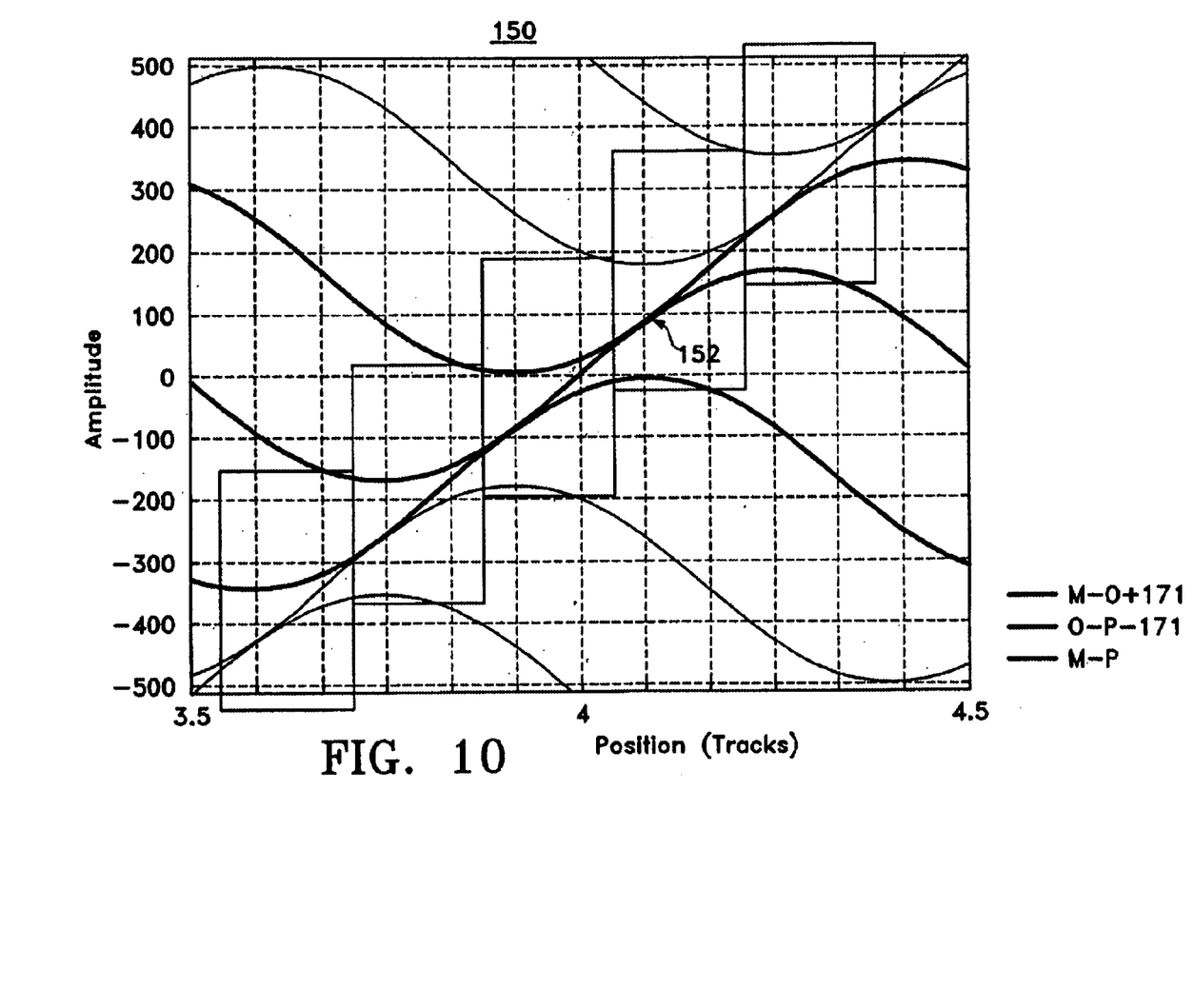
FIG. 10 is a graph illustrating a composite servo position curve obtained from FIG. 9 by inverting and shifting selected S-curves.

Referring to FIG. 10, a graph 150 rendering a piecewise linear position 152 is shown. The graph 150 is obtained from the linear portion of the S-curve (144 for example) within any zone. The S-curves 138–142 of FIG. 9 are inverted and shifted to generate the linear position 152 estimates for the entire offset range at a given point in time. Once the offset is obtained from the linear position 152, the offset is fed to a servo loop for appropriate actuator actions.

Figure 11:
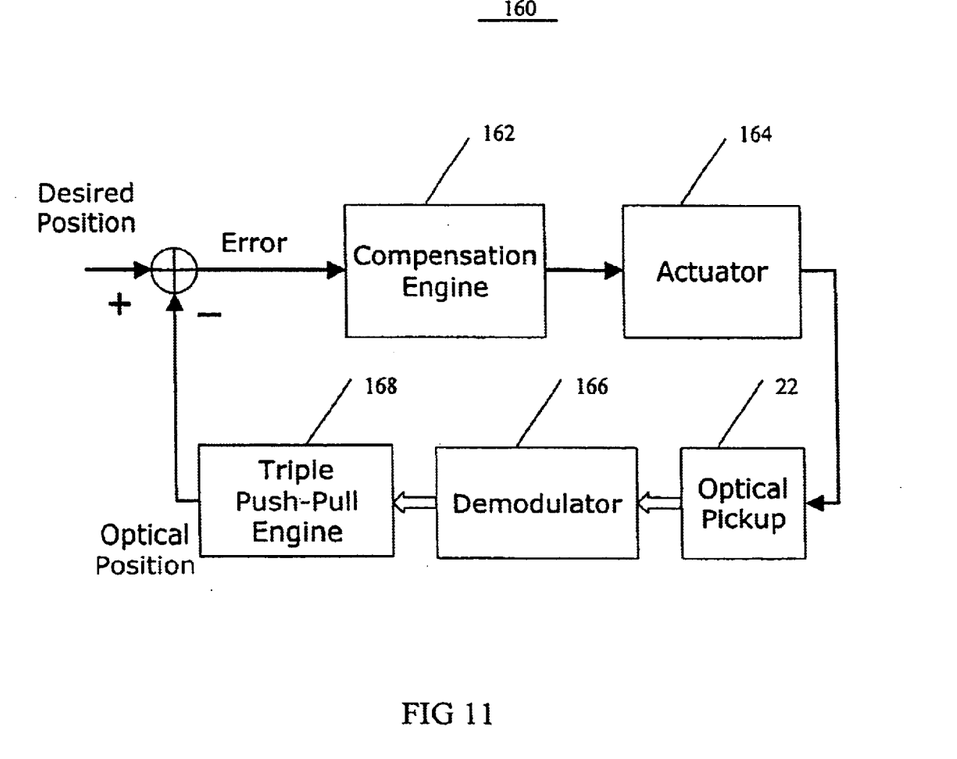
FIG. 11 is a block diagram of the servo control loop to achieve precise positioning of the recording head.

Referring to FIG. 11, a block diagram of the servo control loop system 160 is shown as a closed loop control system that includes a compensation engine 162, an actuator control 164, the optical pickup system 22, a demodulator circuit 166 and a triple push-pull engine 168. The calculated error between the actual measured position and the desired tracking position is fed to the compensation engine 162. The compensation engine 162 compromises the response between the mechanical actuator 164 and an electronic system, and delivers an actuator command based on the compensated position error. The actuator control 164 actuates the actuator 50 in response to the error command and moves the read/write head assembly 14. The optical pickup system 22 picks up updated values of reflectance from the magnetic tape 18, and sends them to the demodulator 166. The function of the demodulator 166 is to convert the sampled reflectance signals due to the series of marks into a continuous analog signal. The three analog signals are then sent to the triple push-pull engine 168 to generate a new position estimate, and so the loop goes on until the actuator converges to the desired position.

Figure 12:
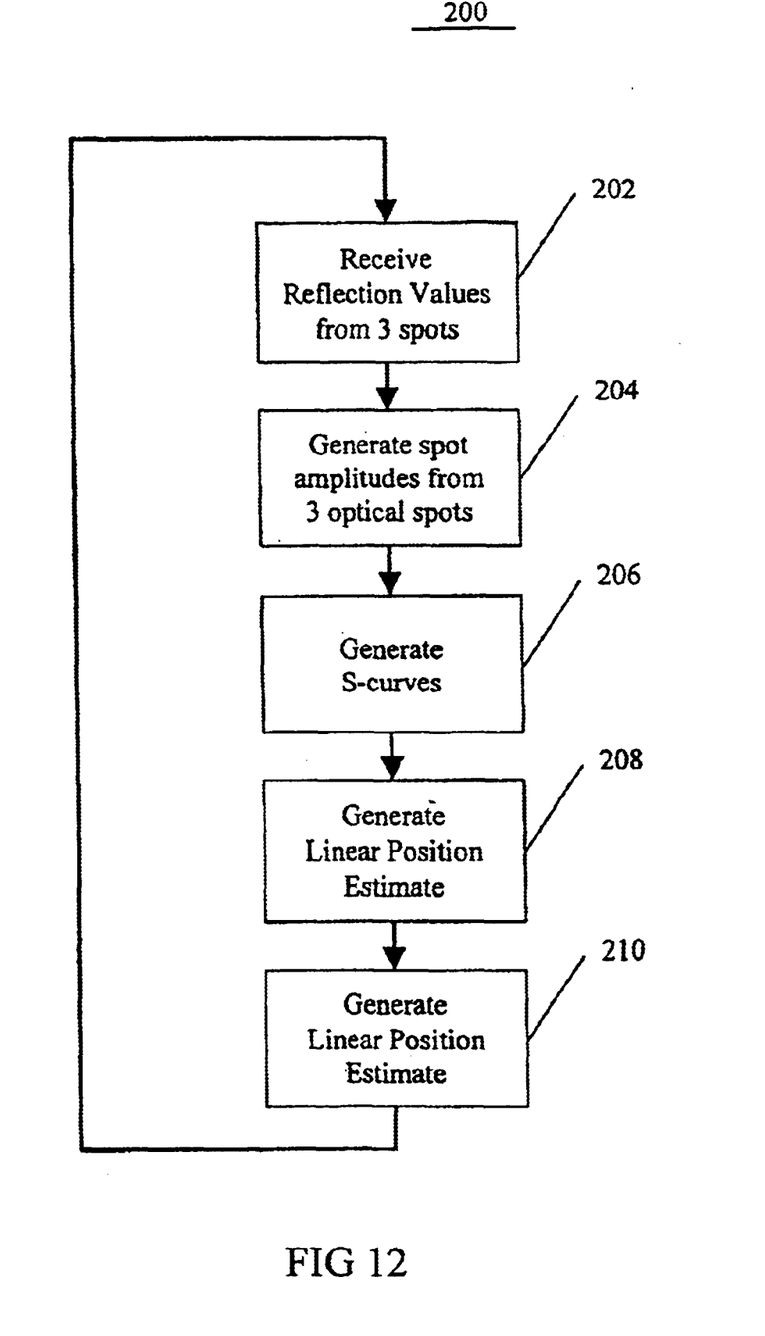
FIG. 12 is flow chart of a triple push-pull process residing in the triple push-pull algorithm engine.

Referring to FIG. 12, a triple push-pull process 200 residing in the triple push pull engine 76 includes receiving 202 a set of three digitized reflectance values from the optical servo track, and generating 204 amplitudes for two spots having the greatest amplitude gradient. The amplitudes are used to generate 206 S-curves. A linear position estimate is generated 208 by inverting and shifting the s-curves as required. The linear position estimate is used 210 to align the magnetic recording head to the linear magnetic tape.

A number of embodiments of the invention have been described. Nevertheless, it will be understood that various modifications may be made without departing from the spirit and scope of the invention. Accordingly, other embodiments are within the scope of the following claims.

What is claimed is:

1. A triple push pull optical tracking method comprising:
   receiving a set of three reflectance values from three optical spots on a recording medium in an optical pickup system;
   generating three S-curves by pair-wise subtraction of reflectance values;
   generating a linear position estimate by processing the S-curves; and
   servoing the optical pickup system to the recording medium.

2. The method of claim 1 wherein the three reflectance values are digitized.

3. The method of claim 1 wherein equal distances separate the three optical spots across a track.

4. The method of claim 1 wherein servoing the optical pickup system comprises comparing a desired position of the optical pickup system to a measured position from the linear position estimate.

5. The method of claim 1 wherein the recording medium is a linear magnetic tape.

6. The method of claim 5 wherein the three optical spots result from servo tracks on a magnetic side of the linear magnetic tape.

7. The method of claim 5 wherein the three optical spots result from servo tracks on a non-magnetic side of the linear magnetic tape.

8. The method of claim 1 wherein the recording medium is an optical disk.

9. A triple push-pull system for generating a composite signal in a closed loop servo signal of a data recording system comprising:
   optical pickup system for generating three optical spots focused on a recording medium, the spots separated by equal distances across a track, the optical pickup system receiving a set of reflectances from the three spots;
   media means for providing the servo tracks responsive to optical spot illumination;
   electronic means for generating a set of three filtered signals from the three reflectances and generating a set of three S-curves by pair-wise subtraction of the filtered signals;
   processing means to generate a composite servo position signal from the S-curves and filtered reflectances; and
   servo means for driving the optical pickup system to a desired position by comparing the desired position to a measured position from the composite servo position.

10. The system of claim 9 wherein the media means is a linear magnetic tape system.

11. The system of claim 10 wherein the servo tracks are provided on a magnetic side of a recording medium of the linear magnetic tape system.

12. The system of claim 10 wherein the servo tracks are provided on a non-magnetic side of a recording medium of the linear magnetic tape system.

13. The system of claim 9 wherein the optical spots are separated by one-third track pitch in a direction across the servo tracks.

14. The system of claim 10 wherein a servo track comprises a series of marks in a form of depressed pits on a back coating of the recording medium.

15. The system of claim 12 wherein a servo track comprises a series of marks in a form of depressed pits on a back coating of the recording medium.

16. The system of claim 9 wherein each reflectance value maximum amplitude is normalized to a constant value.

17. The system of claim 9 wherein processing means to generate a composite servo position signal from the S-curves and filtered reflectances comprise:

choosing the pair of reflectance values with the largest amplitude gradient; and adjusting the chosen s-curve position estimate for the zone based on a slope and an offset.

18. The system of claim 9 wherein individual s-curve position estimates are blended together to generate a continuous position estimate as individual linear sections are traversed.

19. The system of claim 9 wherein the closed loop servo system comprises a digital processor, the digital processor used to perform the composite servo position calculations from the reflectance values, derive a position error signal based on the position estimate and a commanded position, compensate the error signal in such a way as to reduce the lateral tape motion, and command an actuator to follow the lateral tape motion.

20. A method of generating a composite signal in a closed loop servo signal of a data recording system comprising:

generating in an optical pickup system three optical spots focused on a recording medium, the spots separated by equal distances across a track;

receiving a set of reflectances from the three spots;

generating a set of three filtered signals from the three reflectances;

generating a set of three S-curves by pairwise subtraction of the filtered signals;

generating a composite servo position signal from the S-curves and filtered reflectances; and driving the optical pickup system to a desired position by comparing the desired position to a measured position from the composite servo position.

21. The method of claim 20 wherein the recording medium is a linear magnetic tape system.

22. The method of claim 21 wherein servo tracks are provided on a magnetic side of the recording medium of the linear magnetic tape system.

23. The method of claim 21 wherein servo tracks are provided on a non-magnetic side of a recording medium of the linear magnetic tape system.

24. The method of claim 20 wherein the optical spots are separated by one-third track pitch in a direction across servo tracks.

25. The method of claim 20 wherein a servo track comprises a series of marks in a form of depressed pits on a back coating of the recording medium.

26. The method of claim 23 wherein a servo track comprises a series of marks in a form of depressed pits on a back coating of the recording medium.

27. The method of claim 20 wherein generating the set of three filtered signals comprises:

converting electronic current from the reflectances to voltages;

generating the S-curves; and reducing noise in the S-curves.

28. The method of claim 20 wherein each reflectance value maximum amplitude is normalized to a constant value.

29. The method of claim 20 wherein generating a composite servo position signal from the S-curves and filtered reflectances comprise:

choosing the pair of reflectance values with the largest amplitude gradient; and adjusting the chosen s-curve position estimate for the zone based on a slope and an offset.

30. The method of claim 20 wherein individual s-curve position estimates are blended together to generate a continuous position estimate as individual linear sections are traversed.

* * * * *